(12) United States Patent
Modest

(10) Patent No.: US 7,181,406 B1
(45) Date of Patent: Feb. 20, 2007

(54) GEOGRAPHIC MARKET INDICATOR

(75) Inventor: David M. Modest, New York, NY (US)

(73) Assignee: Morgan Stanley Dean Witter & Co., New York, NY (US)

( * ) Notice: Subject to any disclaimer, the term of this patent is extended or adjusted under 35 U.S.C. 154(b) by 71 days.

(21) Appl. No.: 09/678,902

(22) Filed: Oct. 4, 2000

(51) Int. Cl.
G06F 17/60 (2006.01)

(52) U.S. Cl. .......................................... 705/1; 705/36

(58) Field of Classification Search ................ 705/1, 705/36; 345/769
See application file for complete search history.

(56) References Cited

U.S. PATENT DOCUMENTS

| | | | | |
|---|---|---|---|---|
| 4,435,086 A | * | 3/1984 | Kato | 368/22 |
| 5,774,121 A | * | 6/1998 | Stiegler | 345/769 |
| 5,774,878 A | * | 6/1998 | Marshall | 705/35 |
| 5,946,666 A | | 8/1999 | Nevo et al. | 705/36 |
| 6,064,984 A | * | 5/2000 | Ferguson et al. | 705/36 |
| 6,493,681 B1 | * | 12/2002 | Tertitski et al. | 705/36 |

FOREIGN PATENT DOCUMENTS

WO    WO 9526005 A1 *  9/1995

OTHER PUBLICATIONS

Web Pages From Datek Online, 1999-2000, printed through ww.archive.org.*
Information on MapInfo, 2000.*
Lotus 1-2-3-5.0 Linking Data To Geographic Maps, Feb. 1996, Sandhills Publishing Company.*
Streamer Free Real-Time Stock Quote Service Registers 12,000 Users, Nov. 3, 1999, PRNewsWire.*
Information on SmartMoney.com 1998-2003, printed through www.archive.org and www.smartmoney.com.*
Internet Sample Business Plan, Jan. 2000, © Palo Alto Software, Inc.*
Information on NeoVision Hypersystems, Inc., 1998-2000.*
Information on SmartMoney.com, 1998-2000.*
Federal Reserve Bank, Apr. 1998.*
Martin Wattenberg, "Secrets To Using The Map Of The Market", Dec. 31, 1998, http://www.smartmoney.com/stockwatch/index.cfm?story=199812313.*
McEachern, C. Financial Technology Expo Showcases New Products [online], Jan. 2000 [retrieved on Oct. 8, 2000]. Retrieved from the Internet:<URL: http://www.dialogweb.com/search.htl>.
Thomas, P. Visualizing Information: Visualization Systems Data Management [online], Feb./Mar. 1998 [retrieved on Oct. 8, 2001]. Retrieved from the Internet:<URL: http://www.dialogweb.com/search.htl>.
Rademan, C. Where there's heat, there's light [online], Mar. 1997 [retrieved on Oct. 8, 2001]. Retrieved from the Internet:<URL: http://www.dialogweb.com/search.htl>.
Yrastorza, T. The Big Picture [online], Aug. 1996 [retrieved on Oct. 8, 2001]. Retrieved from the Internet:<URL: http://www.dialogweb.com/search.htl.>.

* cited by examiner

*Primary Examiner*—Naresh Vig
(74) *Attorney, Agent, or Firm*—Victor Siber, Esq.; Clifford Chance US LLP

(57) ABSTRACT

A method is provided for displaying the status of a financial indicator using a geographic orientation, where the financial indicator represents financial activity in a particular geographic region. Under the method, a map is displayed that includes the geographic region. Then, a visual indicator that represents the status of the financial indicator is displayed on the geographic region included in the map that is associated with the financial indicator.

25 Claims, 4 Drawing Sheets

GEOGRAPHIC MARKET INDICATOR

BACKGROUND

The following invention relates to a method and system for presenting financial information and, in particular, to the visual presentation of financial information using a geographic orientation.

Accurate and timely analysis of financial information is essential for profiting in the financial markets. As the volume of financial information generated by market activity increases, however, it becomes increasingly difficult to analyze all the relevant information in order to take advantage of market movements and trends. Techniques and systems that organize and analyze financial information and help spot market trends are therefore highly desirable.

One prior art method for organizing financial information is the use of heatmaps. For example, Neovision (http://www.neovision.com/) provides heatmaps that represent selected financial indicators as color-coded cells in which the color and shade of color of a particular cell is related to the percent gain/loss for the financial indicator represented by that cell. If a heatmap includes a color coded cell representing, for example, IBM Corp. shares and IBM Corp. shares are trading up 2% on a particular day, then the IBM cell may be colored a light shade of blue to indicate a 2% gain. If IBM shares go up 4%, then the IBM cell may be colored a medium shade of blue. If however, IBM goes down 2%, the IBM cell may be colored a light shade of red to indicate a 2% drop. The heatmap continuously updates the color coding and shading of the cells based on changes in the underlying instrument.

In addition to the use of color codings and shadings, the size of a cell in the heatmap may be adjusted based on, for example, the market capitalization of the instrument represented by the cell relative to other instruments in a particular sector. For example, SmartMoney (http://www.smartmoney.com/marketmap/) provides a heatmap in which cells representing stocks are grouped by sectors, such as technology and health care. Within the technology sector, for instance, a cell representing Intel shares is color-coded and shaded according to its performance at that time and the size of the Intel cell indicates its market capitalization relative to other stocks in the technology sector.

The SmartMoney heatmap also provides more detailed information about an instrument represented by a particular cell. For example, by moving a pointer (for e.g. controlled by a computer mouse) over the Intel cell, the last sale price of Intel shares, the dollar amount up/down and additional information pertaining to Intel is available.

A drawback of the prior art heatmaps is that they only label the cells that represent financial indicators with the name of the financial indicator and, as in the case of the SmartMoney heatmap, aggregate the cells that represent financial indicators within the same sector. However, the prior art heatmaps do not present financial information in a geographic manner. Geographic information often proves very valuable to a trader or investor. For example, an equity trader may own numerous options positions, each of which may be based on a different country's stock index, such as the Nikkei 225 stock index and the S&P 500 stock index. Because the trader tracks many indices to monitor the trader's positions, labeling each country index with only the name of the index requires the trader to read the name of the index and then associate the name with the related country. Because traders must act quickly to be effective in spotting trends, any delay in the trader being able to assimilate vital information must be avoided. Thus, prior art heatmaps fail to present financial information using a geographic orientation thereby placing the trader at a disadvantage.

Accordingly, it is desirable to provide a visual presentation of financial information using a geographic orientation.

SUMMARY OF THE INVENTION

The present invention is directed to overcoming the drawbacks of the prior art. According to the present invention, a method is provided for displaying the status of a financial indicator using a geographic orientation, where the financial indicator represents financial activity in a particular geographic region. Under the method, a map is displayed that includes the geographic region. Then, a visual indicator that represents the status of the financial indicator is displayed on the geographic region included in the map that is associated with the financial indicator.

In an exemplary embodiment, the status of the financial indicator, which may be for example, an index, includes a percentage change in the continuously updated value of the financial indicator over a given time period.

In another an exemplary embodiment, the displayed map is a world map and the geographic region is a country included in the world map.

In yet another exemplary embodiment, the displayed map is a regional map and the geographic region is a country included in the regional map.

In still yet another exemplary embodiment, the visual indicator is a first color if the percentage change in the value of the financial indicator is in a first, or positive, direction and the visual indicator is a second color if the percentage change in the value of the financial indicator is in a second, or negative, direction.

In another exemplary embodiment, the visual indicator is a third color if the value of the financial indicator is unchanged.

In yet another exemplary embodiment, the first color includes a plurality of shades wherein each of the plurality of shades of the first color is associated with a particular percentage change in the value of the financial indicator in the first direction and the second color includes a plurality of shades wherein each of the plurality of shades of the second color is associated with a particular percentage change in the value of the financial indicator in the second direction. In this case, displaying the visual indicator includes displaying one of the plurality of shades of the first color associated with the percentage change of the financial indicator on the geographic region if the percentage change in the value of the financial indicator is in the first direction and displaying one of the plurality of shades of the second color associated with the percentage change of the financial indicator on the geographic region if the percentage change in the value of the financial indicator is in the second direction.

Accordingly, a method and system is provided for presenting financial information using a geographic orientation in which the percentage change and direction of change of the financial indicator is presented using a visual indicator.

The invention accordingly comprises the features of construction, combination of elements and arrangement of parts that will be exemplified in the following detailed disclosure, and the scope of the invention will be indicated in the claims. Other features and advantages of the invention will be apparent from the description, the drawings and the claims.

DESCRIPTION OF THE DRAWINGS

For a fuller understanding of the invention, reference is made to the following description taken in conjunction with the accompanying drawings, in which.

DETAILED DESCRIPTION OF THE PREFERRED EMBODIMENTS

Figure 1:
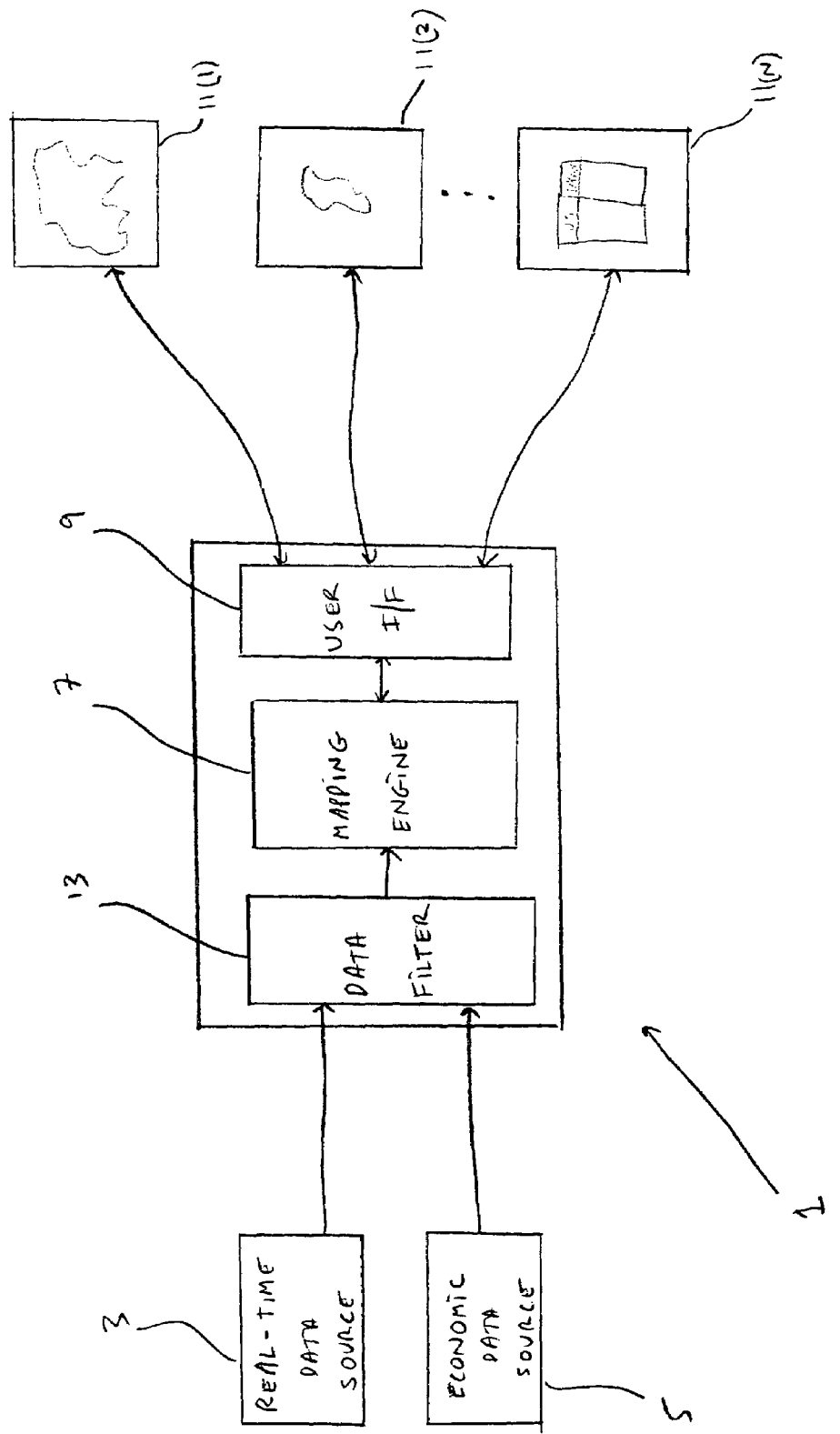
FIG. 1 is a block diagram of the system of the present invention for visually presenting financial information using a geographic orientation.

Referring now to FIG. 1, there is shown a block diagram of a system 1 of the present invention for visually presenting financial information using a geographic orientation. System 1 receives real-time data from real-time data source 3 which includes the real-time pricing information of a financial indicator that is to be displayed using system 1. The financial indicator may be any indicator of financial or economic activity including, but not limited to, an index. Real-time data source 3 may provide other real-time data including, but not limited to, the actual amount the financial indicator has changed, the percentage the financial indicator has changed, the market capitalization of the financial indicator, the currency exchange rate between the currency of the country in which the financial indicator is based and a base currency (for example, the United States dollar) and current news relating to the financial indicator.

System 1 also receives country-related economic data from economic data source 5 which may include, by way of non-limiting example, the gross domestic product for a particular country, the country's population and the currency used in that country.

System 1 includes a data filter 13 that receives the real-time data from real-time data source 3 and the country-related economic data from economic data source 5 and arranges the data according to countries. For example, for Japan, data filter 13 may parse from the real-time data stream the price of the Nikkei 225, the amount the Nikkei 225 is up/down and the USD/JPY exchange rate and may also parse from the economic data stream Japan's gross domestic product. Data filter 13 then aggregates both the real-time and the economic data by country. In addition, data filter 13 may manipulate the data in certain ways, such as, by way of non-limiting example, by calculating the percent change up/down for a particular instrument associated with a given country. Data filter 13 then outputs a data stream that includes the data filtered by country as well the results of any data manipulations.

System 1 also includes a mapping engine 7. Mapping engine 7 includes the cartographic data used to display a map in a variety of formats including, but not limited to, a world map, a continent map and a map of any region of the world. Mapping engine 7 receives the data stream output by data filter 13 and combines the data stream with the cartographic information so that, when the map is displayed, financial and economic information related to a particular country may be visually associated with the display of that country.

A plurality of workstations 11 communicate with system 1 to receive from system 1 a desired map displaying desired financial information according to a geographic orientation. Workstations 11 may be, by way of non-limiting example, a personal computer executing software for communicating with system 1 and including a display for displaying the desired map. System 1 includes a user interface module 9 that receives requests from workstations 11 for particular maps. User interface module 9 forwards such requests to mapping engine 7 which generates the map as desired. User interface module 9 then transmits the desired map to the requesting one of workstations 11, where it is displayed.

Figure 2:
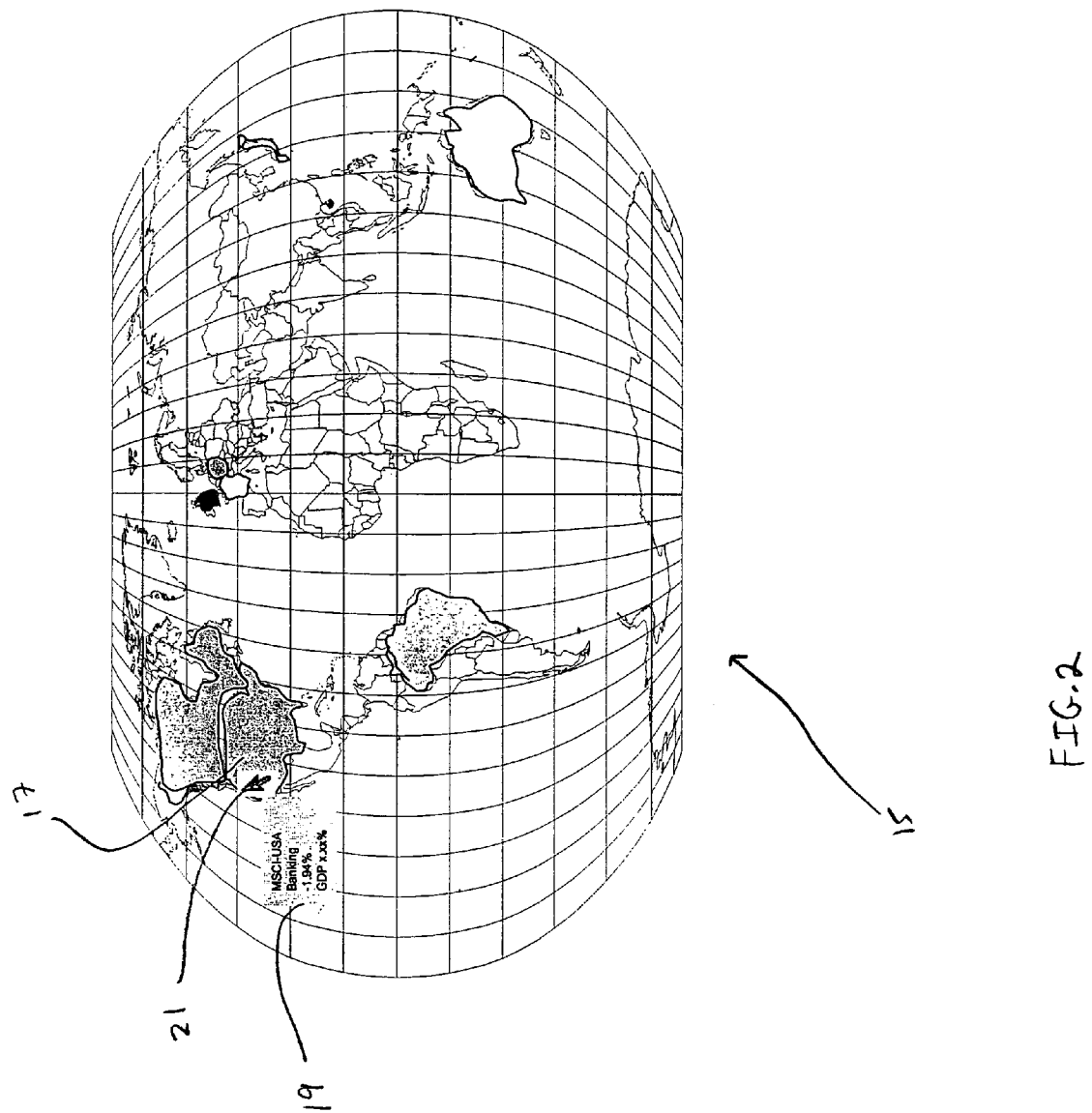
FIG. 2 is a drawing of a world map visually displaying financial information according to the present invention.

Referring now to FIG. 2, there is shown a world map 15 upon which financial information is displayed according to the present invention. Various countries in world map 15 are color coded based on the status of a financial indicator that represents financial activity within that country. For example, in world map 15, a country 17, that represents the United States, may be colored with a particular shade of color, for example a light shade of red, that indicates that the financial indicator selected to represent financial activity in the United States, in this case a banking index, is down in the range of 1–3%. If the banking index was down, for example, 4.5%, then country 17 may be colored a deeper shade of red indicating that the banking index is down in the range of 4–6%. Similarly, if the banking index was up 2%, then country 17 may be colored with a light shade of blue. If the banking index was up 4.5%, then country 17 might be colored with a darker shade of blue. If, however, the banking index was unchanged, then country 17 may be left uncolored, colored in white or any other color that is not used to indicate positive and negative price movements. It will be obvious to select a suitable color and shading scheme to provide a non-numeric visual indication as to whether a particular financial indicator is unchanged, up or down and what percentage or what percentage range the instrument is up or down.

In an exemplary embodiment, the status of a financial indicator that represents financial activity within a particular country is indicated by placing a number that represents the percentage change of the financial indicator in that country in world map 15. If the financial indicator is up, then the number may be of a first color, for example green, and if the financial indicator is down, then the number may be of a second color, for example red. If the financial indicator is unchanged, then the number may be of a third color, for example white. Furthermore, the color of the number may also be shaded thereby indicating the percentage change of the financial indicator, as described above.

Aside from the non-numeric visual indication of the movement of a particular financial indicator, numeric information including real-time financial data and economic data may also be displayed on world map 15. In an exemplary embodiment, as an operator of one of workstations 11 moves a pointer 21 over a country in world map 15, for example country 17, adjacent to country 17 is displayed a popup window 19 containing information relating to the financial indicator associated with country 17 as well as other economic data related to country 17. For example, popup window 19 may include the name of the financial indicator selected to be visually displayed on country 17 of world map 15 as well as the gross domestic product of country 17. Any information that is received by system 1 from real-time data source 3 and country economic data source 5 may be displayed in popup window 19 when activated by pointer 21. It will be obvious to one of ordinary skill to have the display of the real-time financial and economic data be activated using methods other than moving pointer 21 over a country such as, by way of non-limiting example, by invoking a key sequence on one of workstations 11. In addition, the real-time financial and economic data may be displayed in formats other than popup window 19 such as, by way of non-limiting example, by using a designated display area on the display associated with one of workstations 11.

Figure 3:
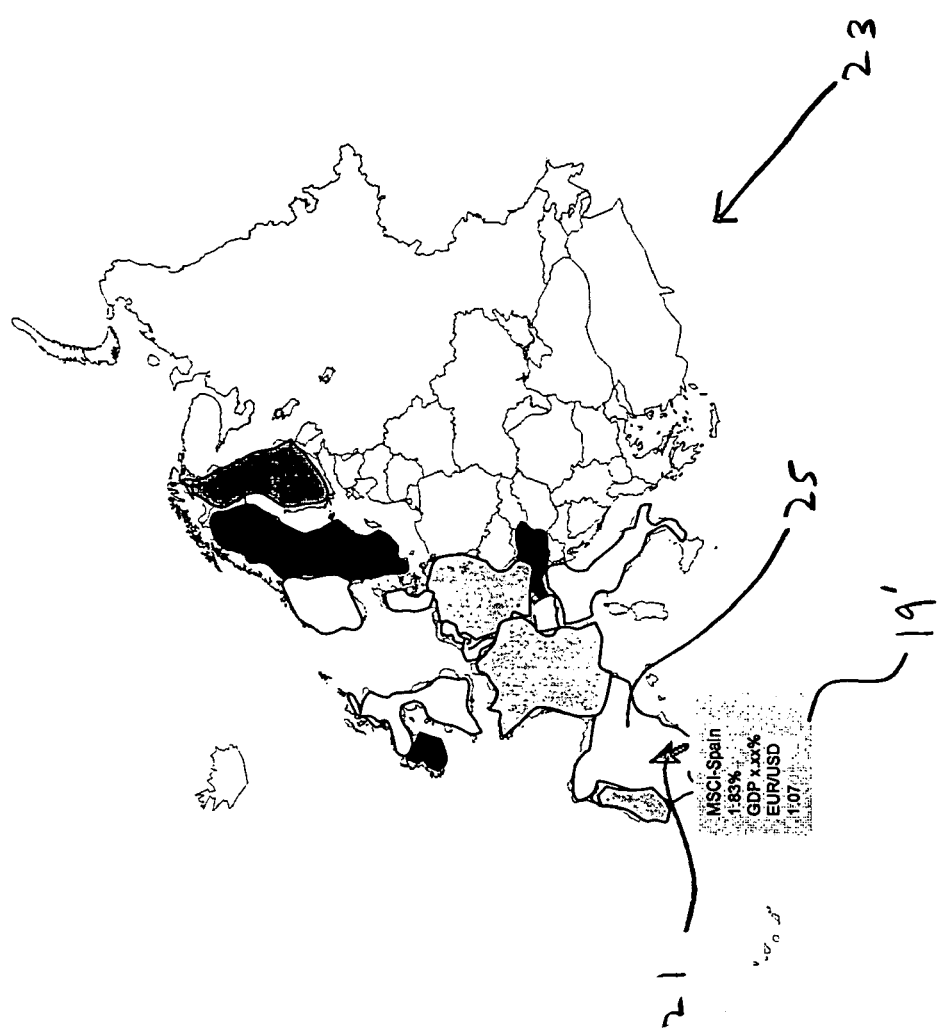
FIG. 3 is a drawing of a regional map visually displaying financial information according to the present invention.

Referring now to FIG. 3, there is shown a regional map 23, upon which financial information is displayed according to the present invention. As with world map 15, various countries in regional map 23 are color coded based on the status of the financial indicator that represents financial activity within that country. For example, in an exemplary embodiment, regional map 23, which is a map of Europe, includes a country 25, that represents Spain, that may be colored with a particular shade of color, for example a light shade of blue, that indicates that the financial indicator selected to represent financial activity in Spain, in this case a country index, is up in the range of 1–3%. When pointer 21 is moved over country 25, popup window 19' is displayed and contains financial and economic information relating to country 25, such as the name of the financial indicator selected to be displayed on country 25 of regional map 23 as well as the gross domestic product of country 25 and the currency exchange rate between the currency of country 25, the Euro, and a chosen base currency, here the U.S. dollar. Regional map 25 may be selected by one of workstations 11 instead of world map 15 so that regions that have numerous small countries, such as Europe, can be more clearly displayed and viewed. On the other hand, world map 15 may be selected instead of regional map 25 so that movements of financial indicators associated with countries across the globe can be compared.

Figure 4:
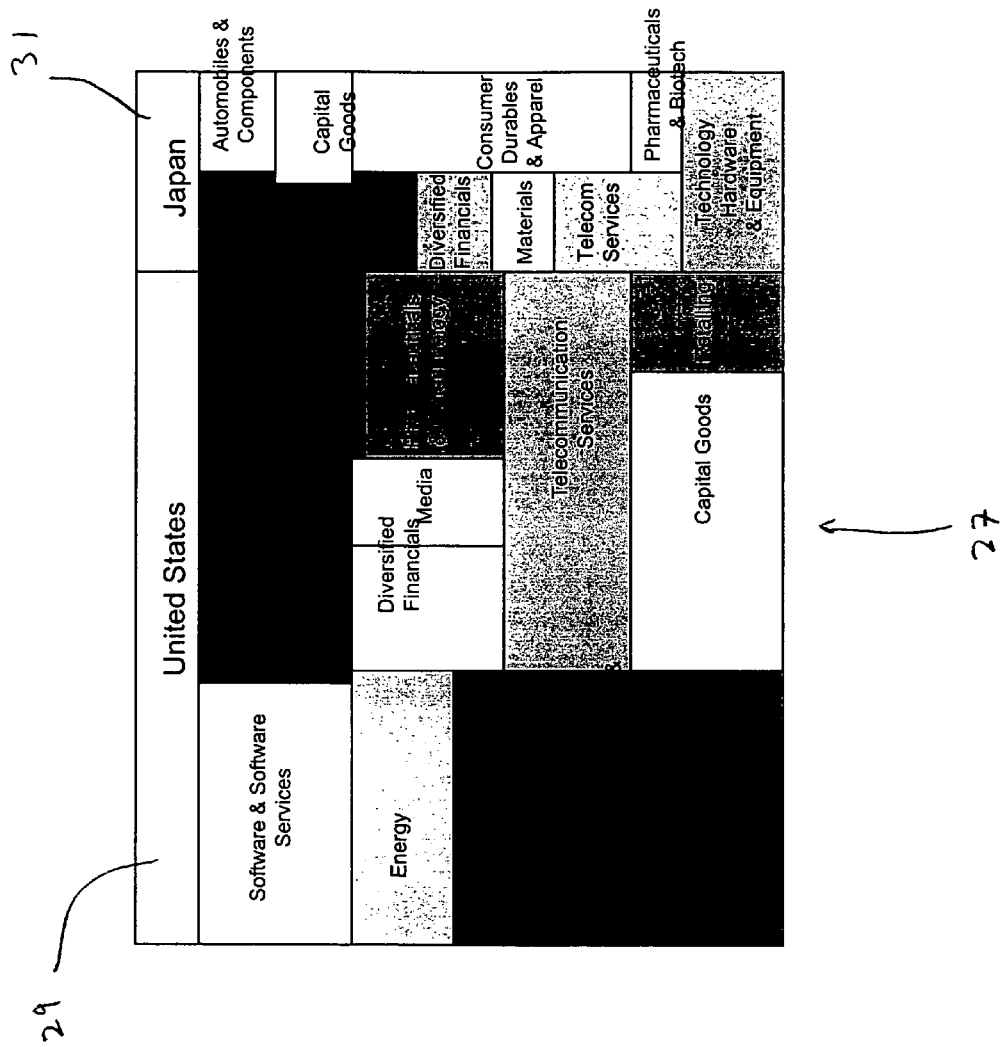
FIG. 4 is a drawing of a sector map visually displaying financial information according to the present invention.

Referring now to FIG. 4, there is shown a sector map 27 which allows for the comparison of selected financial sectors between different geographic regions, according to the present invention. Sector map 27, according to an exemplary embodiment, includes two geographic regions 29 and 31 that each include selected financial sectors of the United States and Japan, respectively. The financial sectors selected for each of geographic regions 29,31 are the sectors used in creating a financial indicator, such as an index, to represent the financial activity in each of geographic regions 29,31. The relative size of the financial sectors are selected according to the weighting the particular financial sector has in the financial indicator. In addition, each sector is color coded and shaded to represent the financial activity within that particular sector as indicated by, for example, the financial activity of particular companies operating within that sector.

Sector map 27 provides financial information using a geographic orientation. First, the relative size of geographic regions 29 and 31 is used to compare the relative market capitalizations of the financial indicators that are represented by each of geographic regions 29 and 31. In addition, the performance of similar sectors across each of geographic regions 29 and 31 may be compared based on the color coding and shading used for each sector. So, for example, the performance of the telecom services sectors in the U.S. and Japan can be compared. Thus, sector map 27 provides a comparison, using a non-numeric, visual presentation, of the activity of numerous financial indicators across geographic regions.

It will be obvious to one of ordinary skill in the art to create a sector map to include more than two geographic regions. In addition, as with the embodiments of FIGS. 2 and 3, when a pointer is moved over a particular sector, a popup window may be displayed that contains financial and economic information relating to that particular sector including, but not limited to, the actual price and change in the index used to represent that sector and the underlying financial indicators that are use to form the sector index.

The financial indicators used by system 1 as a basis for displaying the visual indicator may be any suitable financial indicator that represents the financial activity in a particular geographic region. For example, the financial instrument may be an index, such as the S&P 500, or a proprietary index, such as the MSDW Banking Index. The financial indicator may also be related to the stock market in a particular geographic region. Furthermore, the financial indicator may be merely an indicator of financial or economic activity within a geographic region as well as a tradable instrument.

Although the presenting of financial information using a geographic orientation was described above, it will be obvious to one of ordinary skill to apply the system and method of the present invention to present non-financial information using a geographic orientation. Thus, by using the present invention, any indicator of activity within a geographic region representing, for instance, changes in statistical data, demographic information or any other activity associated with that region, may be visually presented in a geographic orientation. For example, polling data across geographic regions may be presented by coloring and shading each region based on the direction of, and changes in, the polling data. Accordingly, the present invention may be used to visually present both financial and non-financial information according to a geographic orientation.

It will thus be seen that the objects set forth above, among those made apparent from the preceding description, are efficiently attained and, since certain changes may be made in carrying out the above process, in a described product, and in the construction set forth without departing from the spirit and scope of the invention, it is intended that all matter contained in the above description shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

The invention claimed is:

1. A method for displaying the status of at least a first financial indicator and a second financial indicator using a geographic orientation, each said financial indicator representing financial activity in a particular geographic region, each said financial indicator including a plurality of sectors and each of said sectors including a plurality of financial instruments, the method comprising the steps of:

displaying a map, said map including
at least a first geographic region and a second geographic region, and
a first financial indicator representing financial activity in said first geographic region, and a second financial indicator representing financial activity in said second geographic region, said first financial indicator including a plurality of sectors and each of said sectors including a plurality of financial instruments, and said second financial indicator including a plurality of sectors and each of said sectors including a plurality of financial instruments;

simultaneously displaying on said first geographic region of said map a visual indicator that represents the status of said first financial indicator, each of said first financial indicator sectors and each of said first financial indicator financial instruments; wherein each of said first financial indicator plurality of sectors has a size and a weighting in the first financial indicator, wherein said size of each of said first financial indicator plurality of sectors is proportional to said weighting of each of said first financial indicator plurality of sectors, respectively; and simultaneously displaying on said second geographic region of said map a visual indicator that represents the status of said second financial indicator, each of said second financial indicator sectors and each of said second financial indicator financial instruments;

wherein each of said second financial indicator plurality of sectors has a size and a weighting in the second financial indicator, wherein said size of each of said second financial indicator plurality of sectors is proportional to said weighting of each of said second financial indicator plurality of sectors, respectively;

wherein said first geographic region on said map and said second geographic region on said map each have a size and said first financial indicator and said second financial indicator each have a market capitalization, wherein said size of said first geographic region and said size of said second geographic region is proportional to said market capitalization of said first financial indicator and said second financial indicator, respectively.

2. The method of claim 1, wherein the status of at least one of said financial indicators includes a percentage change in the value of said financial indicator at a point in time.

3. The method of claim 2, wherein the status of at least one of said financial indicators is continuously updated.

4. The method of claim 2, wherein said at least one visual indicator is a first color if said percentage change in the value of said at least one financial indicator is in a first direction and said at least one visual indicator is a second color if said percentage change in the value of said at least one financial indicator is in a second direction.

5. The method of claim 4, wherein said first direction is positive and said second direction is negative.

6. The method of claim 4, wherein said first color has a plurality of shades wherein each of said plurality of shades of said first color is associated with a particular percentage change in the value of said at least one financial indicator in said first direction and said second color has a plurality of shades wherein each of said plurality of shades of said second color is associated with a particular percentage change in the value of said at least one financial indicator in said second direction, wherein the step of displaying on at least one of said geographic regions of said map a visual indicator includes the steps of:

displaying one of said plurality of shades of said first color associated with said percentage change of said at least one financial indicator on said geographic region if said percentage change in the value of said at least one financial indicator is in said first direction; and displaying one of said plurality of shades of said second color associated with said percentage change of said at least one financial indicator on said geographic region if said percentage change in the value of said at least one financial indicator is in said second direction.

7. The method of claim 6, wherein said at least one visual indicator is a number.

8. The method of claim 4, wherein said at least one visual indicator is a number.

9. The method of claim of claim 2, wherein said at least one visual indicator is a third color if the value of said at least one financial indicator is unchanged.

10. The method of claim 1, wherein at least one of said financial indicators is an index.

11. The method of claim 1, further comprising the step of:
displaying economic data relating to at least one of said geographic regions.

12. The method of claim 1, wherein at least one of said visual indicators is a number.

13. A system for displaying the status of at least a first financial indicator and a second financial indicator using a geographic orientation, each said financial indicator representing financial activity in a particular geographic region, each said financial indicator including a plurality of sectors and each of said sectors including a plurality of financial instruments, the system comprising:

at least one a data source including the status of said first financial indicator and said second financial indicator;

a mapping engine, said mapping engine having a map including at least a first geographic region and a second geographic region, and a first financial indicator representing financial activity in said first geographic region, and a second financial indicator representing financial activity in said second geographic region, said first financial indicator including a plurality of sectors and each of said sectors including a plurality of financial instruments, and said second financial indicator including a plurality of sectors and each of said sectors including a plurality of financial instruments, said mapping engine receiving the status of said financial indicators from said at least one data source, said mapping engine outputting a signal for simultaneously displaying on said first geographic region of said map a visual indicator that represents the status of said first financial indicator, each of said first financial indicator sectors and each of said first financial indicator financial instruments; wherein each of said first financial indicator plurality of sectors has a size and a weighting in the first financial indicator, wherein said size of each of said first financial indicator plurality of sectors is proportional to said weighting of each of said first financial indicator plurality of sectors, respectively; and said mapping engine outputting a signal for simultaneously displaying on said second geographic region of said map a visual indicator that represents the status of said second financial indicator, each of said second financial indicator sectors and each of said second financial indicator financial instruments, wherein each of said second financial indicator plurality of sectors has a size and a weighting in the second financial indicator, wherein said size of each of said second financial indicator plurality of sectors is proportional to said weighting of each of said second financial indicator plurality of sectors, respectively; and wherein said first geographic region on said map and said second geographic region on said map each have a size and said first financial indicator and said second financial indicator each have a market capitalization, wherein said size of said first geographic region and said size of said second geographic region is proportional to said market capitalization of said financial indicator and said second financial indicator, respectively.

14. The system of claim 13, wherein the status of at least one of said financial indicators includes a percentage change in the value of said at least one financial indicator at a point in time.

15. The system of claim 14, wherein the status of said at least one financial indicator is continuously updated.

16. The system of claim 14, wherein said at least one visual indicator is a first color if said percentage change in the value of said at least one financial indicator is in a first direction and said at least one visual indicator is a second color if said percentage change in the value of said financial indicator is in a second direction.

17. The system of claim 16 wherein said first direction is positive and said second direction is negative.

18. The system of claim 16, wherein said first color has a plurality of shades wherein each of said plurality of shades of said first color is associated with a particular percentage change in the value of said at least one financial indicator in said first direction and said second color has a plurality of shades wherein each of said plurality of shades of said second color is associated with a particular percentage change in the value of said at least one financial indicator in said second direction, and wherein one of said plurality of shades of said first color associated with said percentage change of said at least one financial indicator is displayed on said geographic region if said percentage change in the value of said at least one financial indicator is in said first direction and one of said plurality of shades of said second color associated with said percentage change of said financial indicator is displayed on said geographic region if said percentage change in the value of said at least one financial indicator is in said second direction.

19. The system of claim 18, wherein said at least one visual indicator is a number.

20. The system of claim 16, wherein said at least one visual indicator is a number.

21. The system of claim of claim 14, wherein said at least one visual indicator is a third color if the value of said at least one financial indicator is unchanged.

22. The system of claim 13, wherein at least one of said financial indicators is an index.

23. The system of claim 13, wherein said at least one data source includes economic information relating to at least one of said geographic regions and said economic information is displayed.

24. The system of claim 13, wherein at least one of said visual indicators is a number.

25. The system of claim 13, wherein the system comprises at least two data sources, the first data source including the status of said first financial indicator and second data source including the status of said second financial indicator.

* * * * *